(12) United States Patent
Saari et al.

(10) Patent No.: US 8,792,100 B2
(45) Date of Patent: Jul. 29, 2014

(54) SYSTEM AND METHOD FOR OPTICAL MEASUREMENT OF A TARGET

(75) Inventors: Heikki Saari, VTT (FI); Christer Holmlund, VTT (FI); Uula Kantojarvi, VTT (FI); Rami Mannila, VTT (FI); Antti Lamminpaa, Ellipsikuja (FI); Pekka Teppola, VTT (FI)

(73) Assignee: Teknologian Tutkimu Skeskus VTT, VTT (FI)

( * ) Notice: Subject to any disclaimer, the term of this patent is extended or adjusted under 35 U.S.C. 154(b) by 98 days.

(21) Appl. No.: 13/258,471

(22) PCT Filed: Mar. 31, 2010

(86) PCT No.: PCT/FI2010/050258
§ 371 (c)(1), (2), (4) Date: Sep. 22, 2011

(87) PCT Pub. No.: WO2010/112679
PCT Pub. Date: Oct. 7, 2010

(65) Prior Publication Data
US 2012/0038928 A1 Feb. 16, 2012

(30) Foreign Application Priority Data
Apr. 2, 2009 (FI) ...................................... 20095356

(51) Int. Cl.
*G01B 9/02* (2006.01)
*G01J 3/45* (2006.01)

(52) U.S. Cl.
USPC ........................................................ 356/454

(58) Field of Classification Search
USPC .................. 356/416, 419, 432, 445, 454, 519
See application file for complete search history.

(56) References Cited

U.S. PATENT DOCUMENTS

| | | | | |
|---|---|---|---|---|
| 7,061,618 B2* | 6/2006 | Atia et al. | ...................... | 356/454 |
| 8,233,147 B2* | 7/2012 | Saari | .............................. | 356/326 |
| 8,447,188 B2* | 5/2013 | Scott et al. | ..................... | 398/169 |

FOREIGN PATENT DOCUMENTS

| | | |
|---|---|---|
| WO | WO 2005/038418 | 4/2005 |
| WO | WO 2008/090261 | 7/2008 |

* cited by examiner

*Primary Examiner* — Michael A Lyons
(74) *Attorney, Agent, or Firm* — Mark M. Friedman

(57) ABSTRACT

The invention relates to a system and a method for optical measurement of a target, wherein the target is illuminated, either actively illuminated, reflecting ambient light, or self illuminating, and a measurement light beam received from the target or through it is detected. The prior art optical measurement systems generally include mechanical filter wheels and photomultiplier tubes, which cause the equipment to be expensive, large-sized and often not sufficiently accurate and stable. The objective of the invention is achieved with a solution, in which the illuminating light beam and/or measurement light beam is led through a Fabry-Perot interferometer or a set of two or more Fabry-Perot Interferometers, and the Fabry-Perot interferometer or a set of two or more Fabry-Perot Interferometers is controlled into different modes during the measurement of a single target. The invention can be applied in optical measurements where, for example, reflectance, absorption of fluorescence of the target is measured.

12 Claims, 11 Drawing Sheets

SYSTEM AND METHOD FOR OPTICAL MEASUREMENT OF A TARGET

TECHNICAL FIELD

The invention relates to a system and a method for optical measurement of a target, wherein the target is either actively illuminated, reflecting ambient light, or self illuminating, and a measurement light beam received from the target or through it is detected.

BACKGROUND TECHNOLOGY

Optical measurement systems are used for e.g. analysing properties or material contents of a target. Two basic prior art systems for optical measurement are next described with reference to FIGS. 1, 2a and 2b. FIG. 1 illustrates a system for measuring diffuse reflection of the target by using several wavelengths of light in order to measure contents of different substances in the target. A system with corresponding elements can also be used for measuring light absorbance of a target. FIGS. 2a and 2b illustrate time resolved measurement of fluorescence, whereby emitted light is received from a sample after excitation/activation with a light pulse. The emission of the target or its spectral reflection of ambient light like Sun light is detected using hyperspectral imaging spectrometers.

The system of FIG. 1 has a broadband light source 110, such as a halogen incandescent lamp. A light beam of the light source is collimated with lens 131 in order to lead the light beam through a filter wheel 121. The filter wheel has several filters 122a, 122b which each have a pass band of determined different wavelengths. Between the filters there is an area in the filter wheel which does not transmit light. When the filter wheel 121 rotates around its axis of rotation 123 each filter will successively enter the path of the light beam. Between entering any two filters there is a time period when the light beam of the light source is blocked by the filter wheel as the filter wheel may also serve as a shutter.

The filtered light beam of the light source is directed by a lens 133 into a suitable area at the surface of the target 150. Between the lens 133 and the target 150 there is a beam splitter mirror 135, which reflects a part of the light beam to lens 137 which focuses the beam to a reference detector 139. The reference detector 139 is used for providing feedback data about the intensity of the light beam in order to adjust the light intensity of the light source.

The light beam is reflected at the surface of the measurement target 150, and a part of the reflected light is focused with lenses 161 and 163 to a measurement detector 180. The detector 180 thus measures the intensity of the reflected light at each pass band wavelength of the filters 122a, 122b successively while the filter wheel 121 rotates. The time multiplexed signal received from the detector 180 thus includes the concentration information on corresponding substances in the mixture of the measurement target. The detector can be a point detector for achieving total intensity information of the light reflected from the illuminated area, or an image detector for achieving intensity information on spatial distribution of the reflected light within the illuminated area.

The system of FIG. 1 has certain disadvantages. The rotation speed of the filter wheel has a certain maximum value, and this causes that the time period between measurements with successive filters may be too long in some applications. An accurate measurement requiring repeated measurements also takes a relatively long time. There are also tight requirements for the similarity of the pass band filters needed for the performance of each instrument to be repeatable in terms of centre wavelengths and spectral resolutions at the selected bands. Such requirements cause the production costs of the filters to be high. There is also a problem of temperature dependence of the pass band centre wavelength of the interference filters. Therefore the temperature must be kept at a determined value with a strict tolerance.

The filter wheel is a relatively large component, which causes the measurement equipment to be large in size. Further, if the measurement wavelengths need to be changed, it is necessary to change the filter wheel. This is normally manual work and takes time. It may also be necessary to have a large number of filter wheels, which increases the investment on the equipment. The rotation of the filter wheel also requires an efficient motor, which consumes much energy. The filters are mechanically sensitive, so the rotation with high speed also includes a risk of damaging the filters.

Another solution has been described in prior art which solves a part of the above problems. This solution includes several detectors which each have an optical filter with determined pass band wavelengths. This way it is possible to avoid using a filter wheel. However, the narrowband filters in front of each detector are arranged in one plane but at different locations relative to the optical axis. Therefore the intensity distribution entering the detector plane should be homogenized in such a way that the spatial information from the target is not present in the intensity distribution entering the multiple detectors. Such accurate homogenization is difficult to achieve. Also, this solution does not solve the problems related to the temperature dependence of the filters nor the difficulty to change the pass band wavelengths to be measured.

Prior art hyperspectral imaging instruments are typically push-broom instruments based on Prism-Grating-Prism components, on aberration corrected holographic gratings or on linear variable filters. Push-broom instruments form a spectral image over one dimensional line at a time. This type of imaging spectrometers cannot produce 2D images fast because the target has to move or a scanning optics is required to form a 2D image.

There are prior art technologies which are capable of producing 2D dimensional spectral images by taking a 2D image of the target at predetermined wavelength of the measurement range. Such technologies include using Acousto-Optic Tunable Filters (AOTF) and Liquid Crystal Tunable Filters (LCTF). A typical wavelength-selective liquid crystal tunable filter is constructed from a stack of fixed filters consisting of interwoven birefringent crystal/liquid-crystal combinations and linear polarizers. The spectral region passed by LCTFs is dependent upon the choice of polarizers, optical coatings, and the liquid crystal characteristics (nematic, cholesteric, smectic, etc.). Both AOTF and LCTF technologies suffer from the low light transmission through the tunable filter. In LCTF technology the low transmission is caused by the fact that the light going through the filter must be polarized. In AOTF the light at the selected wavelength is diffracted to the direction of the detector but because the diffraction angle is rather small the throughput of the filter is limited.

FIG. 2a illustrates a system for the measurement of fluorescence from a sample which is located in a micro well 251. The system has a light source 210, which may be e.g. an UV LED or a Xenon flash tube. The light beam of the light source is collimated with a lens 231 and filtered with an excitation band filter 224. The excitation light beam is further focused with a lens 233 to the sample well via a beam splitter mirror 235 which reflects the main portion of the light beam. A minor part of the light beam transmits the mirror 235, and this part of the beam is focused to a reference detector 239, such as a photo diode. This reference detector 239 is used for monitoring the intensity of the excitation light pulses in order to provide feedback data for controlling the light intensity of the light source 210.

A direct fluorescence light is in this example emitted by Europium. An indirect FRET (Fluorescence Resonance Energy Transfer) light is emitted by Alexa647 fluorophore. The emission light from both fluorescence sources transmits the beam splitter 235, after which a dichroic beam splitter mirror 295 is used to separate the emission light into two channels; Alexa647 emission channel and Europium emission channel. The emission light beam from the Europium is reflected by the mirror 295 and collimated with a lens 291. The light beam is then filtered with a Europium emission band pass interference filter 292, which has pass band centre at e.g. 610 nm. The filtered light beam is then focused with a lens 293 to a detector 298, which is usually a photon counter, such as a photomultiplier tube.

The emission light beam from the Alexa647 fluorophore transmits the mirror 295 and it is then collimated with a lens 261. The light beam is then filtered with an Alexa647 emission band interference pass filter 272, which has pass band centre at e.g. 665 nm. The filtered light beam is then focused with a lens 263 to a detector 280, which is also usually a photon counter, such as a photomultiplier tube.

FIG. 2b shows a diagram of the fluorescence light 22 of the sample after the excitation light pulse has been exposed in a time resolved (TR) fluorescence measurement. The horizontal axis describes time and the vertical axis describes fluorescence intensity. After the excitation light pulse there is background fluorescence 26 for a short time period, and therefore the measurement window 24 is started after the background fluorescence has faded into a negligible intensity.

The system of FIG. 2a involves certain disadvantages. The FRET emission signals, such as Alexa647 emission signal, have a very small intensity, and therefore a sensitive photon counter is required. However, such photomultiplier tubes have a large size and they are expensive. On the other hand, semiconductor detectors such as CMOS and CCD image sensors are not sensitive enough for indirect TR-FRET measurements. When photomultiplier tube is used as a detector, it is only possible to measure one point/area of the target at a time, whereby providing an image as a measurement result requires a large number of measurements and moving the target or optics. When microtitration plates with several sample wells are measured, it is necessary to measure each well separately, which causes the measurements to take much time.

A further disadvantage of the prior art solutions described above is that it is difficult to optimize the spectrum of the measurement according to the target/measured substance of the target. While it is possible to produce filters with a specific pass band function, such filters are difficult to produce, and such a filter can be used for only one type of measurement/measured substance.

SUMMARY OF THE INVENTION

The purpose of the present invention is to avoid or reduce disadvantages of the prior art.

The objective of the invention is achieved with a solution, in which the illuminating light beam and/or measurement light beam is led through a Fabry-Perot interferometer, and the Fabry-Perot interferometer is controlled into different modes during the measurement of a single target.

The preferred way to achieve objectives of the invention is to use two Fabry-Perot interferometers which allow the selection of the illumination or measurement spectral band in a larger wavelength range than with a single Fabry-Perot interferometer. This is because the two Fabry-Perot interferometers can be designed to function on different orders, whereby their side bands do not overlap. Therefore, the used wavelength range, determined by e.g. a fixed pass band filter, may include wavelengths of side bands of the Fabry-Perot interferometers. It is also easier to produce the target specific spectral irradiance on the target or target specific spectral transmission for the measurement with at least two Fabry-Perot interferometers because of the larger wavelength range and because of the possibility to have more accurate control of the form of the pass band.

System according to the invention for optical measurement of a target, the system comprising a detector for receiving measurement light beam from or through the target, and optionally a light source for illuminating the target with an illuminating light beam, wherein the system comprises at least one Fabry-Perot interferometer within the path of the illuminating light beam and/or the path of the measurement light beam is characterised in that at least one light transmission characteristic of a first Fabry-Perot interferometer is controllable, whereby the first Fabry-Perot interferometer may include one Fabry-Perot interferometer or a set of two or more interferometers, the system has first means for controlling the first Fabry-Perot interferometer into at least two modes with different values of said characteristic, and the first means for controlling are arranged to control the first Fabry-Perot interferometer into at least two modes with different values of said characteristic during a measurement of a single target.

Method according to the invention for optical measurement of a target, wherein the target is either illuminated with an illuminating light beam, reflecting ambient light, or self illuminating, and measurement light beam is received by a detector from the illuminated target, wherein the illuminating light beam and/or the measurement light beam is led through a Fabry-Perot interferometer, is characterised in that during a measurement of a single target at least one light transmission characteristic of a first Fabry-Perot interferometer, wherein the first Fabry-Perot interferometer may include one Fabry-Perot interferometer or a set of two or more interferometers, is controlled successively into at least two modes, wherein the value of said characteristic has a different value in said at least two modes.

Some preferable embodiments of the invention are described in the dependent claims.

In some embodiments the modes of the Fabry-Perot interferometer or a set of two or more Fabry-Perot Interferometers may include pass band filtering with specific pass bands. Thus successive measurements with specific wavelengths can be made. In some embodiments the modes of the Fabry-Perot interferometer or a set of two or more Fabry-Perot Interferometers may also include a shutter mode, in which the Fabry-Perot interferometer or a set of two or more Fabry-Perot Interferometers does not pass light on any measurement wavelengths. When the Fabry-Perot interferometer or a set of two or more Fabry-Perot Interferometers is alternately controlled to pass different specific wavelengths of light, and into the shutter mode during the measurement of a target, it is possible to replace the filter wheel with such an arrangement. The Fabry-Perot interferometer or a set of two or more Fabry-Perot Interferometers may be included on the path of the illuminating light beam or the measurement light beam or both. An advantage of providing the Fabry-Perot interferometer or a set of two or more Fabry-Perot Interferometers on the path of the illumination light beam, i.e. between the light source and the target, is that the total radiation intensity on the target can be minimized, and the warming effect on the target is thus minimal. An advantage of providing the Fabry-Perot interferometer or a set of two or more Fabry-Perot Interferometers on the path of the measurement light beam, i.e. between the target and the detector, is that a possible ambient light can be filtered out.

In the inventive system it may also be preferable to include a further pass band filter on the light path in order to filter out any possible light which is passed through a first Fabry-Perot interferometer on a different interference order than which is used for providing the predetermined, specific pass band of the Fabry-Perot interferometer, used for the measurement. Such a further pass band filter may be provided by a successive low pass filter and a high pass filter with fixed cut-off wavelengths. A Fabry-Perot interferometer may also be used as a further pass band filter. In this case, the further Fabry-Perot interferometer is controlled to have substantially same centre wavelength of its pass band as the first Fabry-Perot interferometer when the first Fabry-Perot interferometer is in a pass band mode. However, the two successive Fabry-Perot interferometers preferably have different orders of interference in order to attenuate each other's side bands. This way, also a narrower pass band is achieved. When a set of two or more Fabry-Perot interferometers are used, it is still preferable to include a fixed pass band filter for determining the overall wavelength range of operation. This way it is possible to avoid transmittance of light which has its wavelength outside the operating range of the Fabry-Perot interferometers.

In some further embodiments the pass band of a Fabry-Perot interferometer or a set of two or more Fabry-Perot Interferometers is scanned through a determined range of wavelengths. By controlling the scanning speed of one or several Fabry-Perot interferometers it is possible to achieve a desired time integral of each passed wavelength. When the detected measurement light is integrated over the scanning period, a target specific illumination or filtering of the measurement light beam is achieved, depending on whether the Fabry-Perot interferometer or a set of two or more Fabry-Perot Interferometers is located on the path of the illumination light beam or on the path of the measurement light beam, respectively. The use two or more Fabry-Perot Interferometers enables the more accurate target specific illumination or filtering. The characteristic of an interferometer can thus be the speed of scanning as a function of the centre wavelength, for example. When the speed is controlled, the speed parameter can have different values during the measurement of a single target, whereby different measurement modes are used. On the other hand, using a constant scanning speed for the measurement can be regarded as one mode of interferometer operation.

In certain embodiments of the invention a shutter mode of the Fabry-Perot interferometer or a set of two or more Fabry-Perot Interferometers is used in time resolved measurements of fluorescence. With a shutter mode it is possible to block the measurement light beam from reaching the detector during an excitation light pulse and possibly during a determined time period after the excitation. During a further, determined detection time window after excitation the Fabry-Perot interferometer or a set of two or more Fabry-Perot Interferometers is/are controlled into a pass band mode in which the Fabry-Perot interferometer or a set of two or more Fabry-Perot Interferometers passes the emission light to be measured. Based on the shutter mode, it is possible to integrate light signals of the detector from several emissions which are received after corresponding excitation light pulses. This way it is possible to improve the signal-to-noise ratio of the measurement, and to use detectors with lower sensitivity and cost.

In some embodiments the detector of the inventive system is a point detector. A point detector thus provided a signal which corresponds to the total amount of light received to the detector from the target. In other embodiments the detector of the inventive system is an image detector. An image detector provides an image of the target on the basis of the spatial distribution of light received from the target.

Significant advantages can be achieved with the invention when compared to the known solutions. A Fabry-Perot interferometer can be controlled to change its pass band between different wavelengths in a short time, such as 100 μs. With the invention it is possible to provide measurements with different wavelengths using much higher repetition rate, such as 100 times higher, than by using a filter wheel. Subsequently, the time period between two successive measurements with two different wavelengths of light can be made much smaller. It is also possible to achieve accurate wavelength and spectral resolution values as well as reproducibility for the pass band of a Fabry-Perot interferometer or a set of two or more Fabry-Perot Interferometers.

In the inventive solution the pass bands can be changed by using electrical control, whereby it is possible to provide measurements with different sets of wavelengths without any need for changing components between the measurements. It is also possible to provide target specific illumination or filtering by just programming the one or multiple Fabry-Perot interferometers control parameters according to the required illumination spectra or filtering functions.

The inventive multiple Fabry-Perot interfereometers based spectrometer can produce spectral image of the target at the predetermined wavelengths fast because the required wavelength bands can be selected in a short time by controlling air gaps of a set of Fabry-Perot interferometers. By proper selection of Fabry-Perot mirror coatings the technology based on the use of multiple Fabry-Perot interferometers can provide better light transmission than the AOTF and LCTF technologies.

It is also possible to provide a system according to the invention into a small space because large-sized components are not needed. A size of a Fabry-Perot interferometer is not larger than any other optical components, such as lenses, which are used in small-sized optical measurement equipment. Also, because there are no moving parts which have a large mass, the power consumption of the measurement equipment can be made small. This also makes providing the temperature control and ventilation of the equipment easy. A system according to the invention can also be made robust, because mechanically sensitive components are not needed.

The invention also allows using low-cost detectors which are commonly manufactuned in mass production, such as CMOS or CCD detectors. Even if emission with very small intensity is measured, it is possible to provide integration of responses from several emissions, whereby good signal-to-noise ratio can be achieved even if less sensitive detectors are used. The use of less sensitive semiconductor detectors also allows the use of semiconductor image detectors, whereby image measurements can be performed. This allows providing information on spatial distribution of the measured substance in the target, or measuring several adjacent sample wells simultaneously, without a need to move the samples or the optics. In general, it is not necessary, nor preferable to move or change the target between applying at least the two modes of the Fabry-Perot interferometers that are used during the measurement of the single target.

In this patent application the term "Fabry-Perot interferometer" means a component with at least two reflecting surfaces which cause an interference effect when illuminated with radiation. The pass band of a Fabry-Perot interferometer is proferably electrically controllable. The pass band may relate to transmitted and/or reflected radiation of a Fabry-Perot interferometer.

In this patent application the terms "radiation" or "light" are used to mean any radiation in the optical range of wavelengths.

In this patent application the term "fluorescence" is used to mean any process in which an emission signal is received from a target material as a direct or an indirect result of an excitation or activation light pulse directed to the target.

SHORT DESCRIPTION OF THE DRAWINGS

In the following part the preferable exemplary embodiments of the invention are described in more detail by referring to the enclosed drawings, in which:

FIG. 4b illustrates spectral radiance of the light source of the system of FIG. 4a;

FIG. 4c illustrates tailored spectral radiance as measured after the two successive Fabry-Perot interferometers of FIG. 4a;

Figure 8:
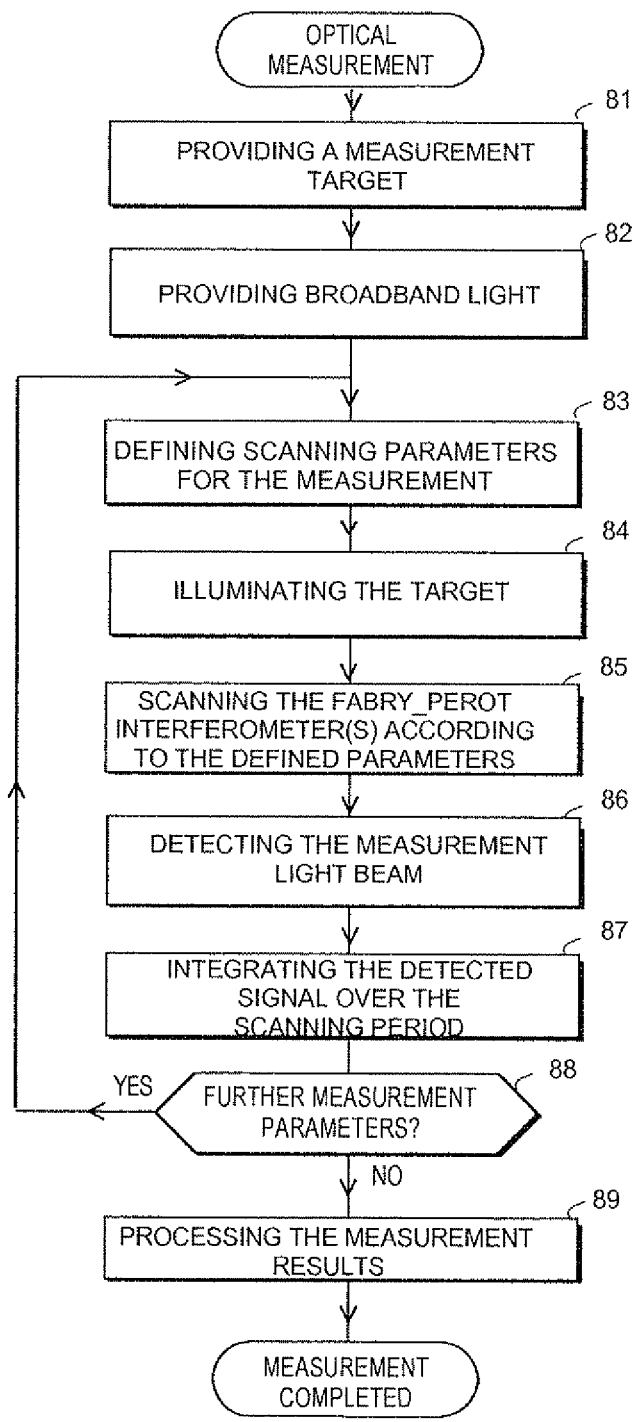
Figure 9:
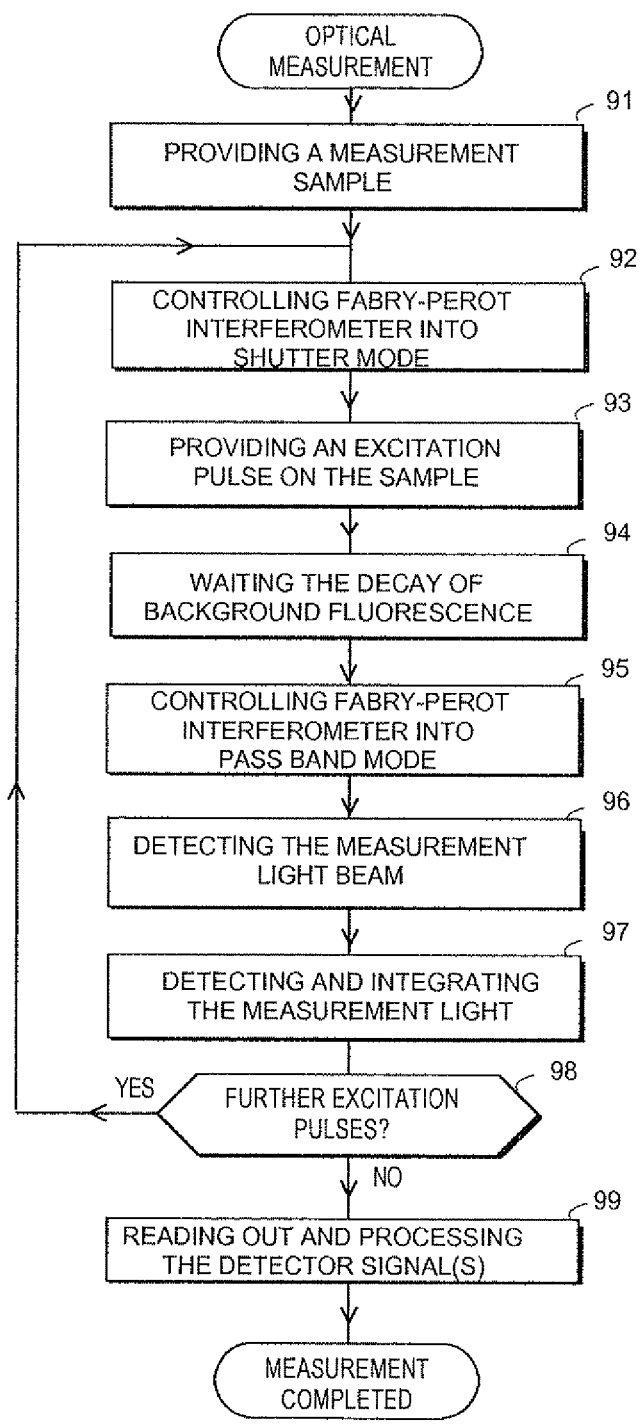

FIG. 8 illustrates an exemplary method for optical measurement according to the present invention, wherein target specific illumination is used and light transmitted through the target is measured; and FIG. 9 illustrates an exemplary method for optical measurement according to the present invention, wherein a Fabry-Perot interferometer is used in pass band and shutter modes on the path of the emission light beam.

DETAILED DESCRIPTION OF EMBODIMENTS

Figure 1:
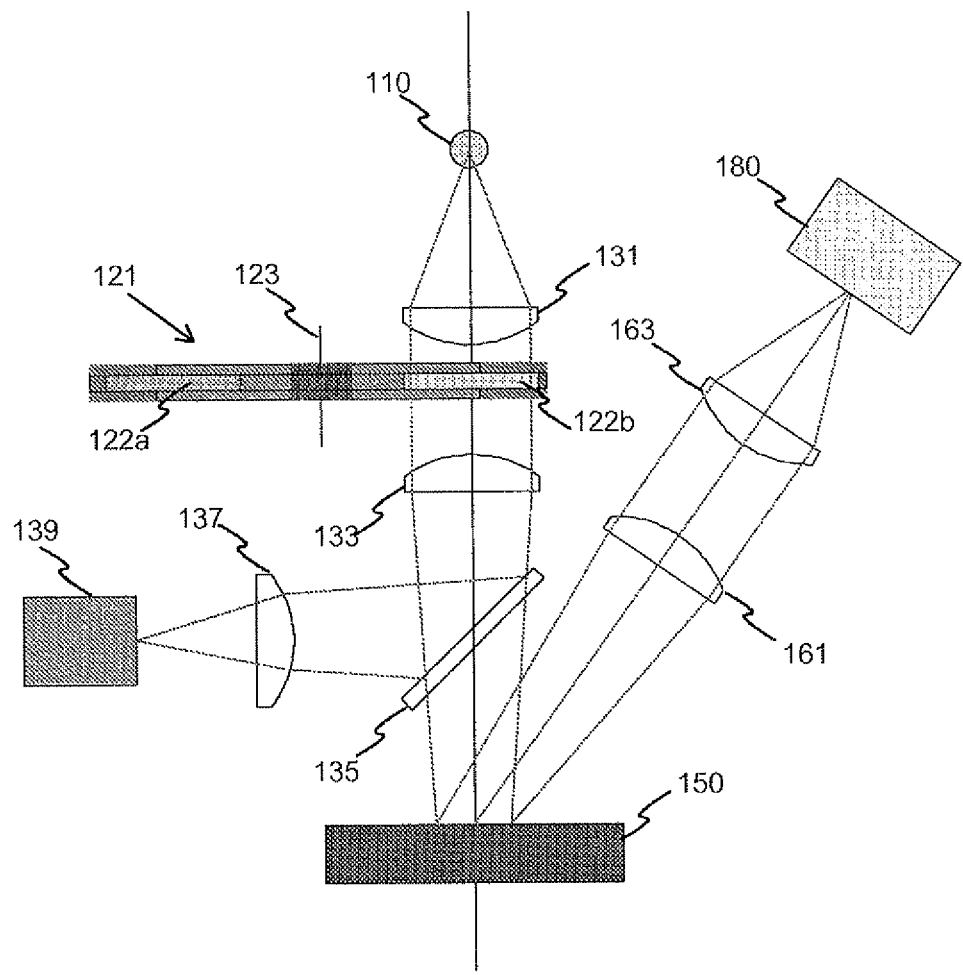
FIG. 1 illustrates a prior art optical measurement system with a rotating filter wheel.
Figure 2A:
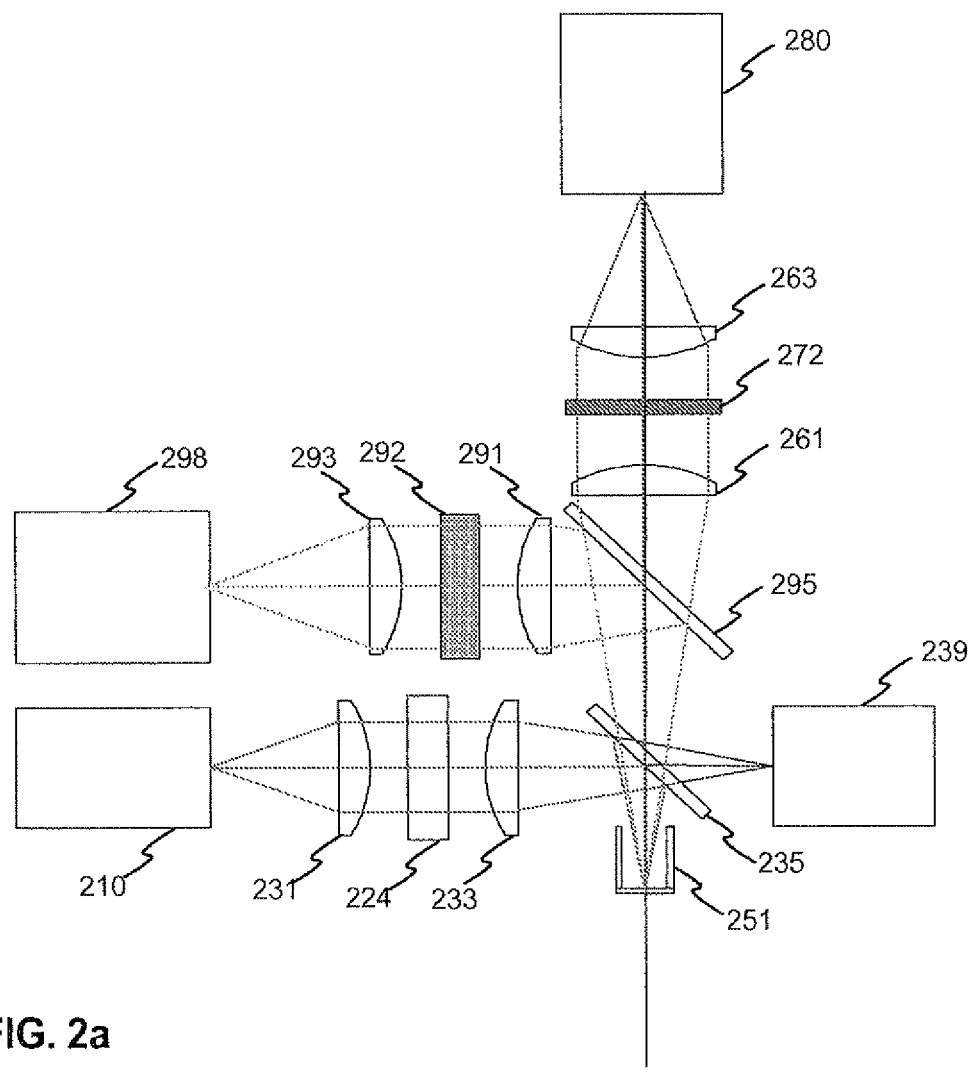
FIG. 2a illustrates a prior art optical measurement system for measuring time resolved fluorescence.
Figure 2B:
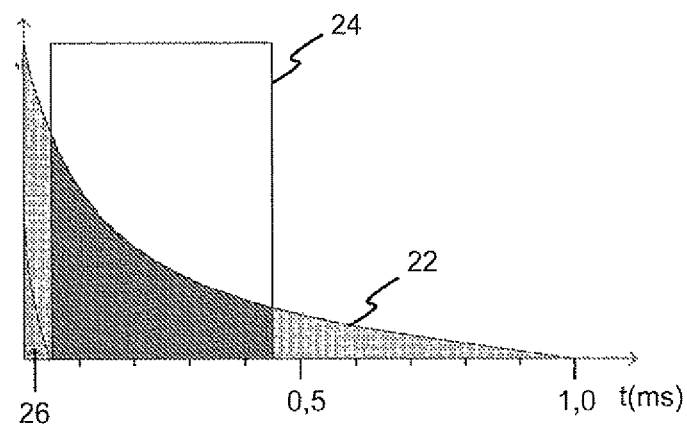
FIG. 2b illustrates a diagram for emission intensity in a time resolved measurement.

FIGS. 1, 2a and 2b were described in the prior art description above.

Figure 3A:
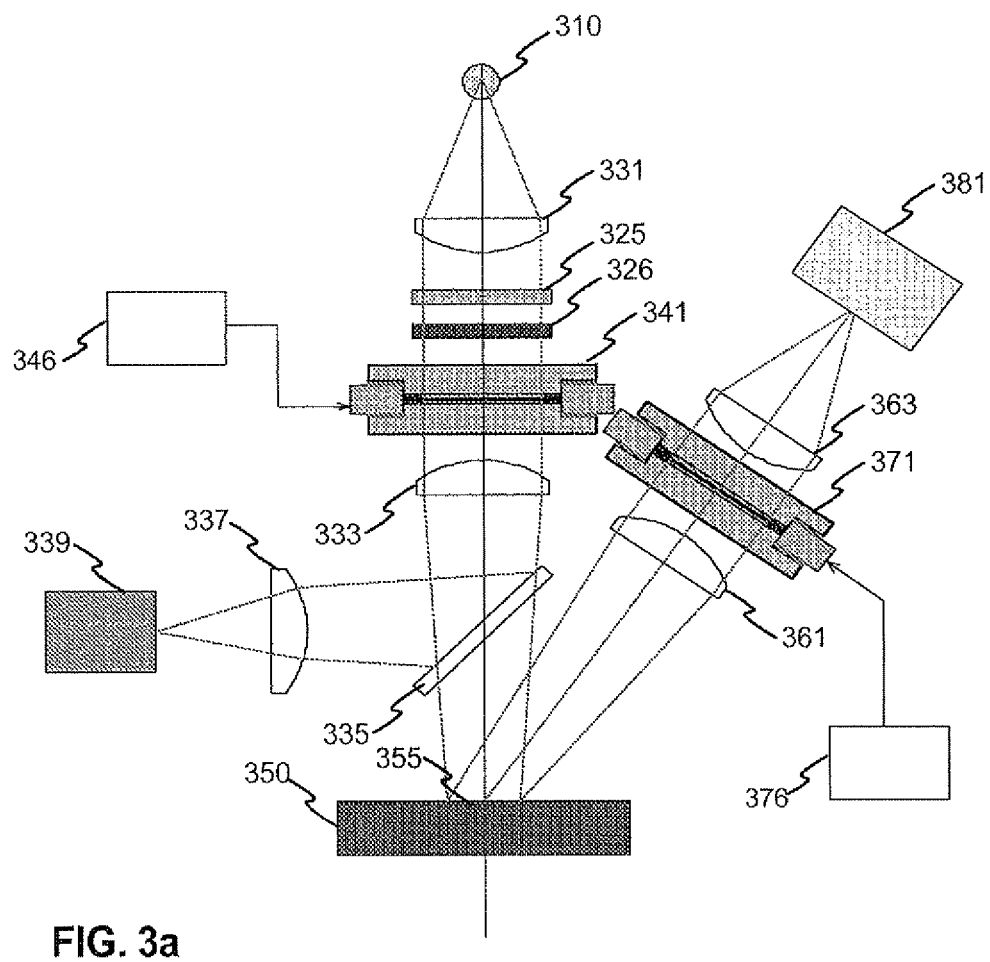
FIG. 3a illustrates an exemplary optical measurement system according to the invention, wherein controllable Fabry-Perot interferometers are used in alternated pass band and shutter modes and successive pass bands have different wavelengths.

FIG. 3a illustrates an exemplary optical measurement system according to the invention, wherein controllable Fabry-Perot interferometers are used in alternated pass band and shutter modes at both illuminating path and measurement path in order to perform measurements with different successive wavelengths.

The system of FIG. 3a has a broadband light source 310, such as a halogen incandescent lamp. A light beam of the light source is collimated with lens 331 and led through a low pass filter 325 and a high pass filter 326. The purpose of the low pass and high pass filters is to serve as a pass band filter which determines the overall measurement range of wavelengths and substantially blocks light on wavelengths that are outside the operating area of the Fabry-Perot interferometers.

Figure 3B:
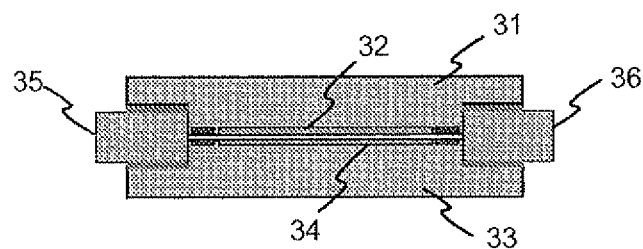
FIG. 3b illustrates an enlarge view of a Fabry-Perot interferometer which can be used in the present invention.

The illuminating light beam is further led through a first Fabry-Perot interferometer 341, which is controlled by first control means 346. An enlarged illustration of the Fabry-Perot interferometer is shown in FIG. 3b. The interferometer has two substrates 31 and 33, which have reflecting surfaces 32 and 34. The reflecting surfaces are close to each other, whereby a narrow gap is formed between the mirrors. The width of the gap is controlled with piezo actuators 35 and 36 by applying a control voltage to the actuators. The substrates normally also include electrodes (not shown in the FIG. 3b), which are used for measuring the actual distance between the mirrors. This way an accurate control of the gap width is achieved. Fabry-Perot interferometers are described in more detail in several publications, such as document WO2008090261 A1. It is also possible to use Fabry-Perot interferometers which are based on other technology than piezo actuators. An example of another technology is micro-mechanical Fabry-Perot interferometers.

In FIG. 3a, the light beam from the Fabry-Perot interferometer 341 is directed by a lens 333 into a suitable area 355 at the surface of the target 350. Between the lens 333 and the target 350 there is a beam splitter mirror 335, which reflects a part of the illumination light beam to lens 337 which focuses the beam to a reference detector 339. The reference detector 339 is used for providing feedback data about the intensity of the illumination light beam in order to adjust the light intensity of the light source and to monitor the operation of the first Fabry-Perot interferometer.

The light beam is diffusely reflected at the surface 355 of the measurement target 350, and a part of the reflected light is collimated with a lens 361 to a second fabry-Perot interferometer 371. The second Fabry-Perot interferometer is controlled by control means 376. The light which passes the Fabry-Perot interferometer 371 is then focused with a further lens 363 to a detector 381.

The Fabry-Perot interferometers 341 and 371 are controlled to such pass bands which correspond to the wavelengths that are used in the measurement. The interferometers 341 and 371 are first controlled into a first pass band mode for the measurement with a light of first wavelength. The interferometers are then controlled into a shutter mode wherein the interferometers do not pass light of any wavelengths that are within the detecting range of the detector. Then, the interferometers are controlled into a second pass band mode for the measurement with a light of second wavelength. After the measurement, the interferometers are controlled into a shutter mode. The interferometers are controlled into successive pass band and shutter modes as many times as measurements are required. The measurements may be performed once or several times with each wavelength.

The time multiplexed signal received from the detector 380 thus includes the concentration information on corresponding substances in the mixture of the measurement target. The detector can be a point detector for achieving total intensity information of the light reflected from the illuminated area, or an image detector for achieving intensity information on spatial distribution of the reflected light within the illuminated area.

Figure 3C:
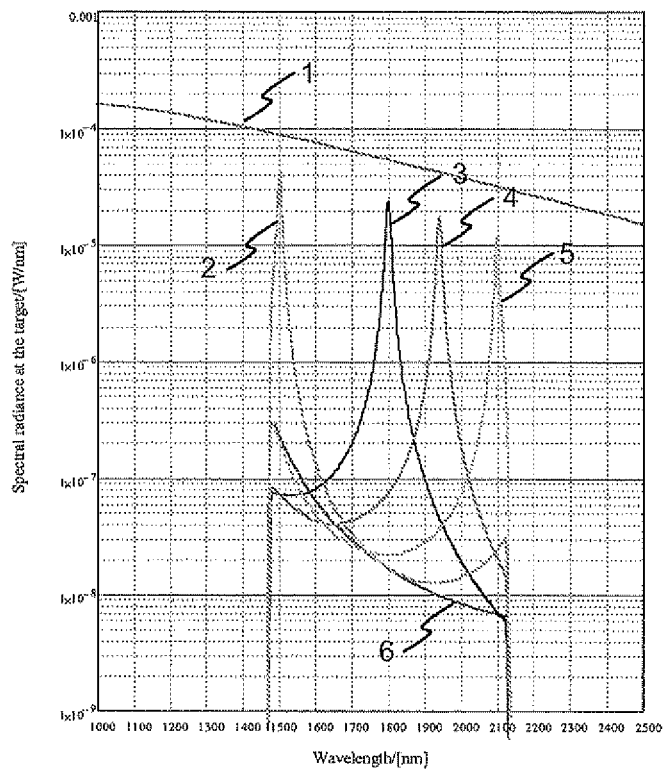
FIG. 3c illustrates a diagram of a simulated response of a light source and a Fabry-Perot interferometer which is successively controlled into four pass band modes and a shutter mode.
Figure 3D:
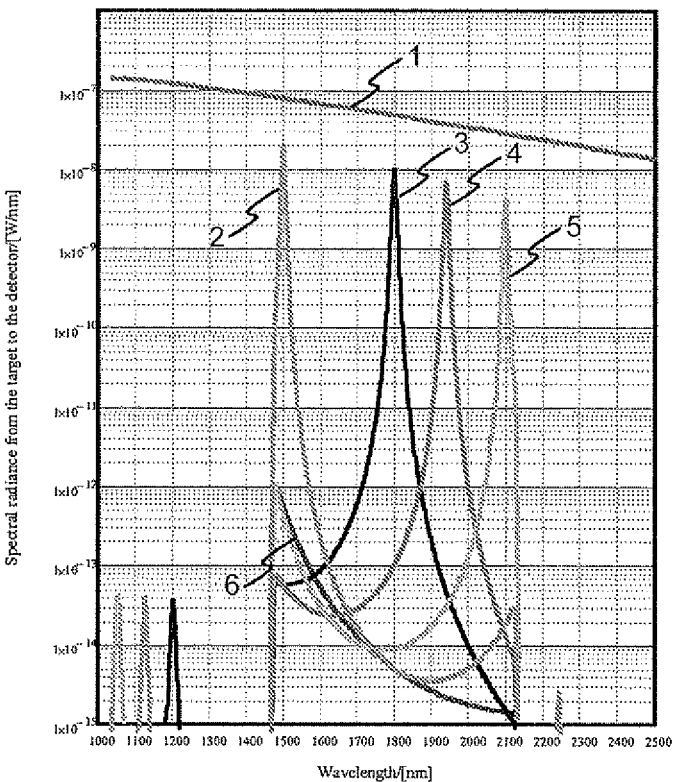
FIG. 3d illustrates a diagram of a simulated response of a system according to FIG. 3a including Fabry-Perot interferometers on both the illuminating path and the measurement path, with a target of paper material.

FIGS. 3c and 3d illustrate spectral radiance diagrams which show simulated intensity values of light in the system of FIG. 3a. The curve 1 of FIG. 3c shows the radiance of the light source 310. The curves 2-6 show spectral radiances as measured after the first Fabry-Perot interferometer 341. Curve 2 shows the spectral radiance when the interferometer 341 has been controlled to a pass band mode wherein the centre wavelength is 1500 nm. Curve 3 shows the spectral radiance when the interferometer 341 has been controlled to a pass band mode wherein the centre wavelength is 1800 nm. Curve 4 shows the spectral radiance when the interferometer 341 has been controlled to a pass band mode wherein the centre wavelength is 1940 nm. Curve 5 shows the spectral radiance when the interferometer 341 has been controlled to a pass band mode wherein the centre wavelength is 2100 nm. Curve 6 shows the spectral radiance when the interferometer 341 has been controlled to a shutter mode wherein transmittance is substantially blocked at all wavelengths within the overall measurement range.

FIG. 3d illustrates spectral radiances as measured after the second Fabry-Perot interferometer 371. In this simulation it has been assumed that the target is paper material. Curves 2, 3, 4 and 5 show the spectral radiances when the interferometer 341 has been successively controlled to a pass band modes wherein the centre wavelengths are 1500 nm, 1800 nm, 1940 nm, and 2100 nm respectively. Curve 6 shows the spectral radiance when the interferometer 341 has been controlled to a shutter mode wherein transmittance is substantially blocked at all wavelengths within the overall measurement range.

The diagrams of FIGS. 3c and 3d clearly show that it is possible to achieve measurements with narrow wavelength bands of light, wherein the wavelength band is controllable with one or several Fabry-Perot interferometer(s). The simulations of FIGS. 3c and 3d are based on interferometers which operate in the first order of interference. It is possible, for example, that the first interferometer on the path of the illumination light beam operates at the first order of interference, but the second interferometer operates at a higher order, such as $2^{nd}$, $3^{rd}$ or $4^{th}$ order. By using a higher order of interference it is possible to achieve a narrower pass band.

It should be noted that it is possible to use one or several Fabry-Perot interferometers on the path of the illuminating light beam as well as on the path of the measurement light beam as shown in FIG. 3a, but it is also possible to use other configurations. For example, it is possible to use one or several interferometers on the path of the illuminating light beam, but to use no interferometer on the path of the measurement light beam. It is possible to use one or several interferometers on the path of the measurement light beam, but to use no interferometer on the path of the illuminating light beam.

One should also note that it is possible to measure the light which passes through the target instead or in addition to the light reflected from the target. In such case there is are corresponding lenses, possible Fabry-Perot interferometer(s) and a detector which measure signal received at the opposite side of the target.

Figure 4A:
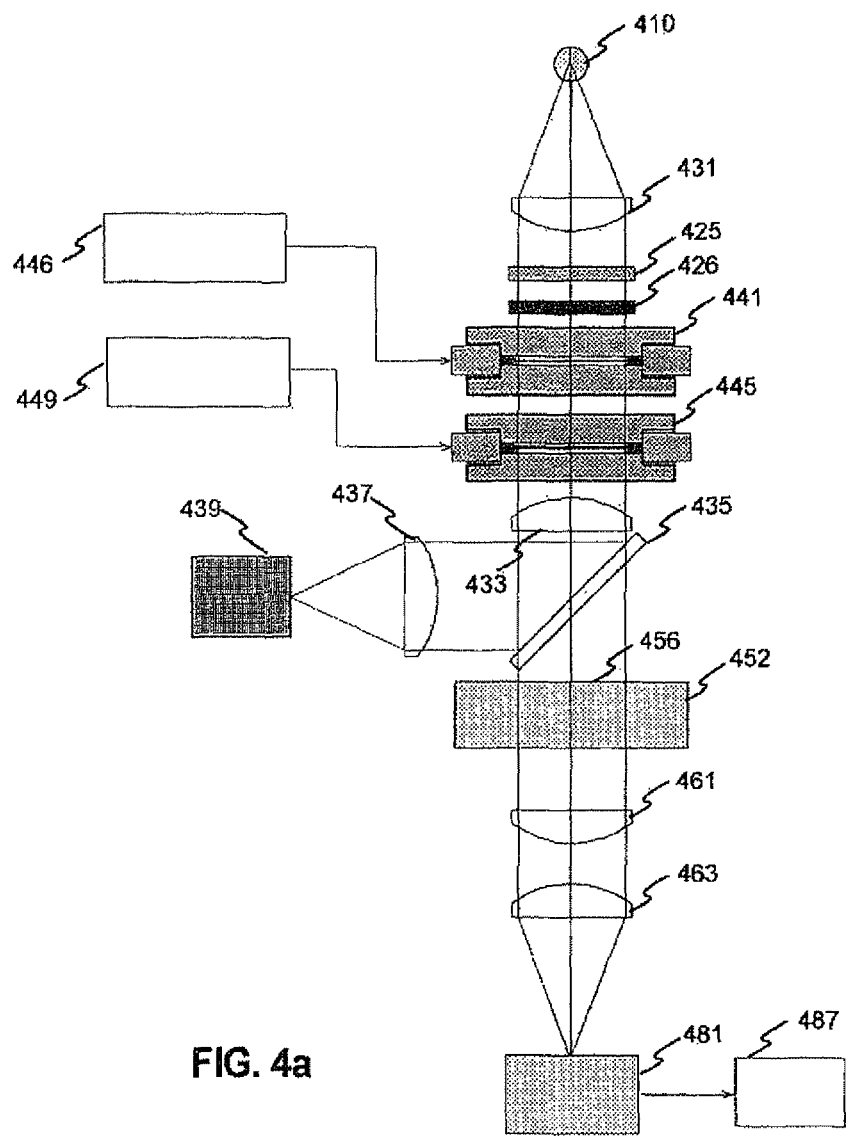
FIG. 4a illustrates an exemplary optical measurement system according to the present invention, wherein target specific illumination is used and light transmitted through the target is measured.

FIG. 4a illustrates an exemplary optical measurement system according to the present invention, wherein target specific illumination is used and light transmitted through the target is measured.

Figure 4B:
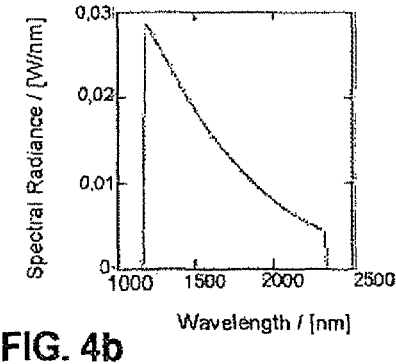

The system of FIG. 4a has a broadband light source 410, such as a halogen incandescent lamp. A light beam of the light source is collimated with lens 431 and led through a low pass filter 425 and a high pass filter 426. The purpose of the low pass and high pass filters is to serve as a pass band filter which determines the overall measurement range of wavelengths and substantially blocks light on wavelengths that are outside the operating area of the Fabry-Perot interferometers. An example of the spectral radiance received after the low pass and high pass filters is shown in FIG. 4b.

The illuminating light beam is further led through two successive Fabry-Perot interferometers 441 and 445. The light beam from the Fabry-Perot interferometers is directed by a lens 433 into a suitable area 456 at the target 452. Between the lens 433 and the target 450 there is a beam splitter mirror 435, which reflects a part of the illumination light beam to a lens 437 which focuses the beam to a reference detector 439. The reference detector 439 is used for providing feedback data about the intensity of the light beam in order to adjust the light intensity of the light source and to monitor the operation of the Fabry-Perot interferometers.

A part of the illumination light beam is reflected from the target, another part of the illumination light beam is absorbed into the target, and the rest of the light beam transmits the target and is received at the opposite side of the target as a measurement light beam. The measurement light beam is focused to the detector 481 with lenses 461 and 463.

Figure 4C:
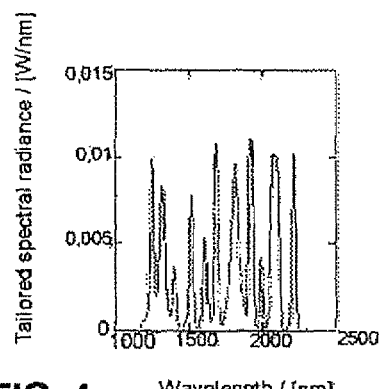

The Fabry-Perot interferometers 441 and 445 are controlled by control means 446 and 449 respectively. The Fabry-Perot interferometers are controlled to scan their pass bands through a required wavelength range. The scanning speed is controlled by the control means 446, 449 in such a way that during the scan a predetermined total amount of transmitted light is received after the Fabry-Perot interferometers at each wavelength of radiation. An example of a spectral radiance received after the Fabry-Perot interferometers is shown in FIG. 4c. The detected measurement light beam is then integrated over the scanning time by an integrator 487, whereby the predetermined spectral weighting is achieved in the measurement. By programming suitable scanning rate functions it is possible to provide target specific spectral measurements for several properties of the target.

In another embodiment the scanning Fabry-Perot interferometer(s) are located at the path of the measurement light beam, between the target and the detector. In such a case the scanning Fabry-Perot interferometers provide a target specific spectral filtering of the measurement light beam. It is possible to achieve an optimized contrast of a required property/substance of the target by using either location of the Fabry-Perot interferometers.

It should be noted that it is also possible to use a target specific illumination or a target specific filtering of the measurement light beam in a system where measurement light has been reflected from the target.

It should also be noted that the embodiment of FIG. 4a is suitable for point detection as well as image detection by selecting a suitable detector.

Figure 5A:
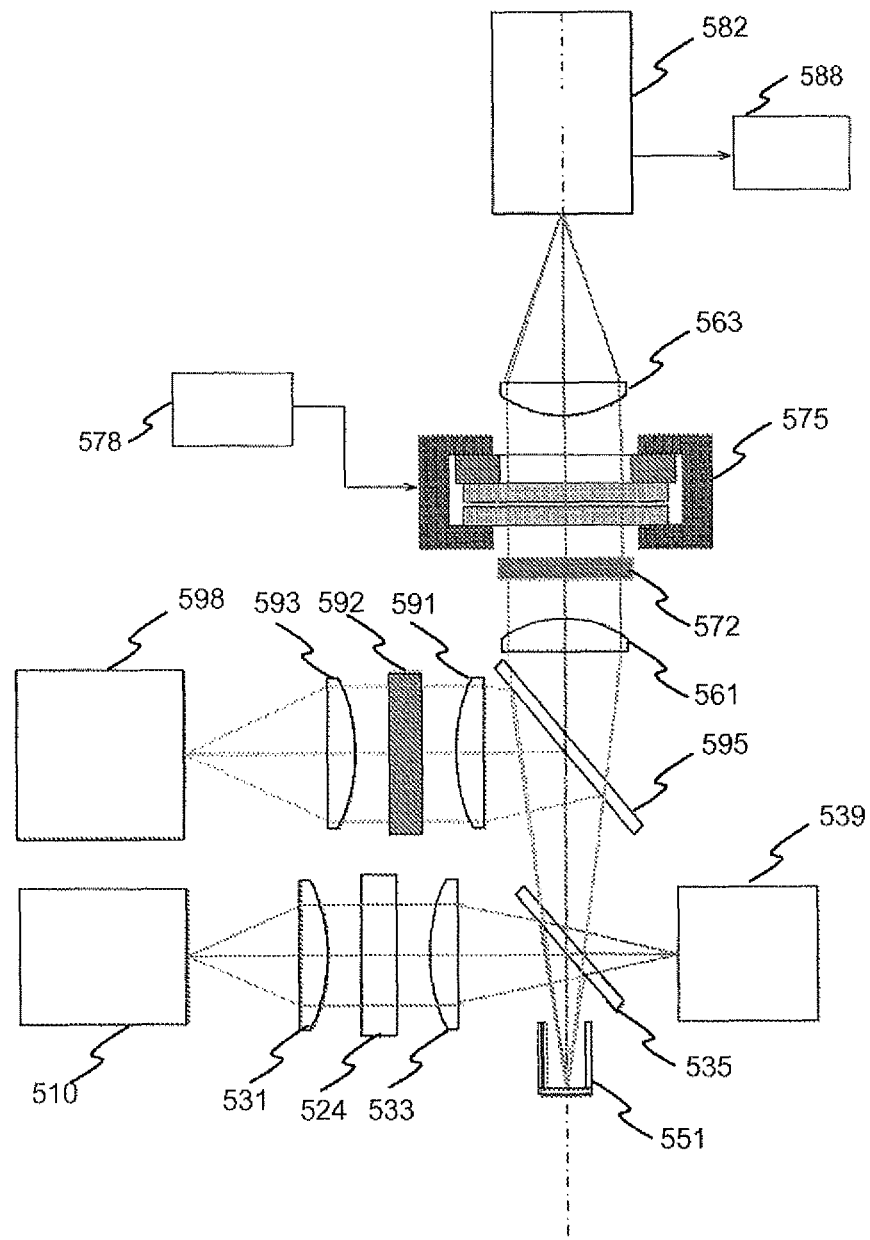
FIG. 5a illustrates an exemplary optical measurement system according to the present invention for measuring time resolved fluorescence, wherein a Fabry-Perot interferometer is used in pass band and shutter modes on the path of the emission light beam.

FIG. 5a illustrates a system for the time resolved measurement of fluorescence emission from a target sample which is located in a micro well 551. The system has a light source 510, which may be e.g. an UV LED or a Xenon flash tube. The light beam of the light source is collimated with a lens 531 and filtered with an excitation band pass filter 524. The excitation light beam is further focused with a lens 533 to the sample well via a beam splitter mirror 535 which reflects the main portion of the light beam to the sample well. A minor part of the light beam penetrates through the mirror 535, and this part of the beam is focused to a reference detector 539, such as a photo diode. This reference detector 539 is used for monitoring the intensity of the excitation light pulses in order to provide feedback data for controlling the light intensity of the light source 510.

A direct fluorescence light is in this example emitted by Europium. An indirect FRET (Fluorescence Resonance Energy Transfer) light is emitted by Alexa647 fluorophore. The emission light from both fluorescence sources transmits the beam splitter 535, after which a dichroic beam splitter mirror 595 is used to separate the emission light into two channels; Alexa647 emission channel and Europium emission channel. The emission light beam from the Europium is reflected by the mirror 595 and collimated with a lens 591. The light beam is then filtered with a Europium emission band pass interference filter, which has pass band centre at e.g. 610 nm. The filtered light beam is then focused with a lens 593 to a detector 598. The detector may be a photomultiplier tube, but it is also possible to use less a expensive semiconductor detector because the emission of the Europium has a relatively strong intensity. The detector may be a point detector or an image detector.

The emission light beam from the Alexa647 fluorophore transmits the mirror 595 and it is then collimated with a lens 561. The light beam is then filtered with an Alexa647 emission band pass interference filter 572, which has pass band centre at e.g. 665 nm. The filtered measurement light beam is further led through a Fabry-Perot interferometer 575, which is controlled by control means 578. The Fabry-Perot interferometer serves both as a pass band filter and a shutter. The filtered light beam is then focused with a lens 563 to a detector 582. The detector 582 is arranged to integrate measurement light from several pulses received from the sample. The electric response is then read by signal acquisition means 588, and the signal is converted into a measurement value.

The light source 510 is controlled to transmit successive excitation pulses to the sample. Each emission from Europium is separately detected during the measurement time window with the detector 598, and the resulted signal is converted into a measurement value. The detector 598 is cleared at the beginning of the measurement window, and the detector is read at the end of the measurement window, whereby no shutter is required for the detection.

However, the emission received from the Alexa647 fluorophore is integrated at the detector from several emission pulses. The Fabry-Perot interferometer 575 is controlled by the control means 578 into a shutter mode during the excitation pulse and during a predetermined time period after the excitation pulse. During the measurement time window the Fabry-Perot interferometer is controlled into a pass band mode, wherein the centre wavelength of the pass band is e.g. 665 nm. This way it is possible to prevent excitation light or background fluorescence from reaching the detector, and thus it is possible to integrate measurement light beam from several successive emissions before the detector signal is read out. The tests of the applicant have shown that it is possible to control the Fabry-Perot interferometer from one mode into another in less than 0,1 ms, whereby the loss of emission signal during the transition of modes is negligible.

When several emission light beams are integrated it is possible to increase the signal-to-noise ratio of the emission measurement. When N emission signals are integrated, the received emission signal is increased by factor N, but the readout noise does not increase. Therefore, it is possible to increase the signal-to-noise ratio more than if each successive emission signal would be read out separately.

When the measurements can be performed with less sensitive semiconductor detectors, it is possible to use also imaging semiconductor detectors such as CMOS and CCD imaging detectors. It is then possible to provide an image as a measurement result, describing the spatial distribution of the emissive substance. When using an image detector, it is also possible to provide a simultaneous measurement of several samples of a microtitration plate.

The embodiment described above shows the measurement of the emission light beam from above the sample. However, it is possible as well to measure the emission light beam from below the sample when the bottom of the sample well is made of transparent material. It is also possible to provide the excitation light pulse from below the sample.

The embodiment described above related to a measurement of specific fluorescence emission. However, the same principle can be used for the optical measurement of other kinds of targets as well.

In the embodiment described above, the first detector 598 measures each direct emission signal separately. However, it is naturally possible to apply a Fabry-Perot interferometer for providing a shutter mode and a pass band mode also in the measurement of the direct emission. This way a better signal-to-noise ratio is achieved also in the direct measurement, which may be useful especially when an image detector is used.

Figure 5B:
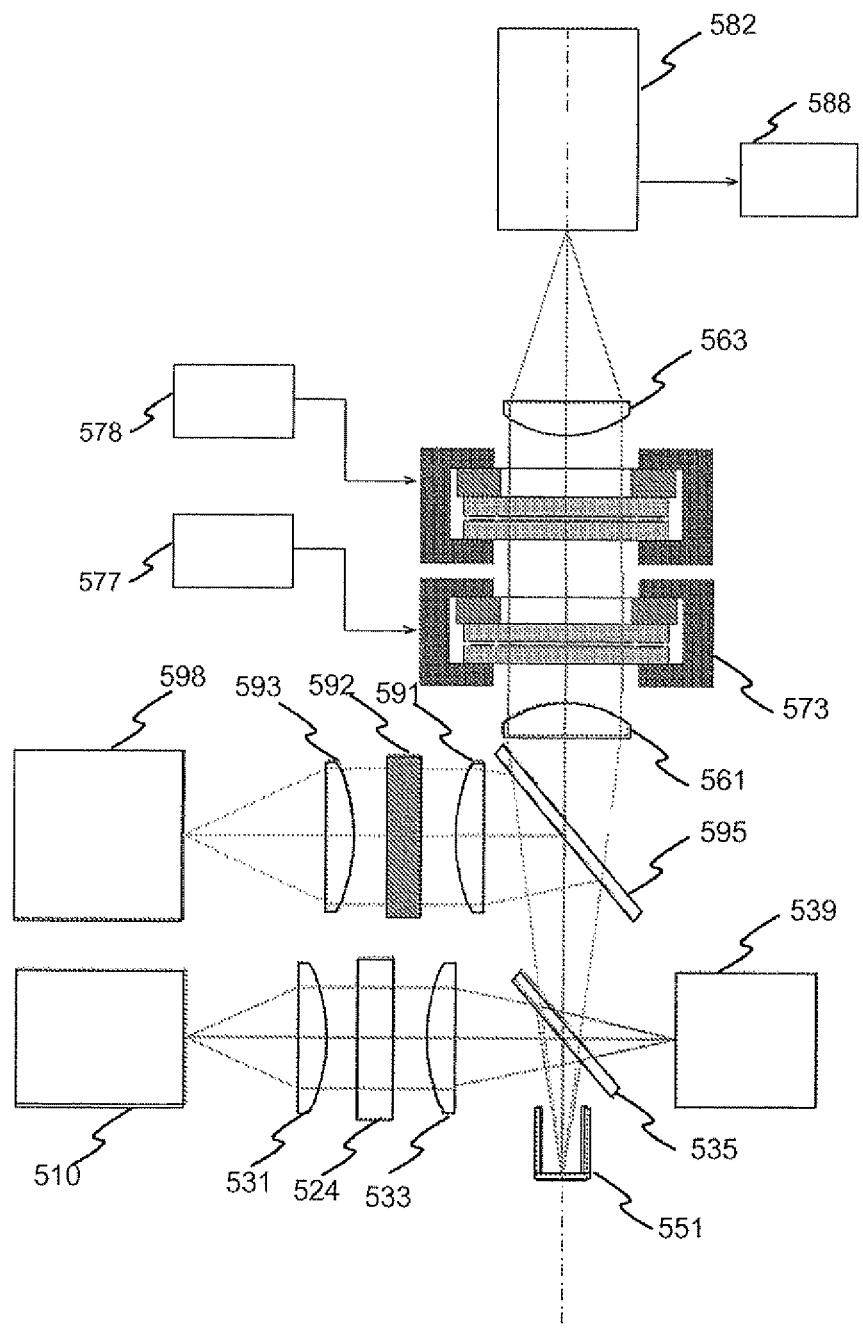
FIG. 5b illustrates an exemplary optical measurement system according to the present invention for measuring time resolved fluorescence, wherein two successive Fabry-Perot interferometers are used in pass band and shutter modes on the path of the emission light beam.

FIG. 5b illustrates another system for optical measurement of fluorescence from samples. The system has similar parts as the system shown in FIG. 5a, but the system of FIG. 5b includes two successive Fabry-Perot interferometers 573, 575 on the path of the measurement light beam with their corresponding control means 577, 578. The second Fabry-Perot interferometer 573 replaces the pass band filter of the system according to FIG. 5a. The second Fabry-Perot interferometer can be controlled in a similar manner as the first Fabry-Perot interferometer; i.e. between shutter and pass band modes. It is also possible to control the second Fabry-Perot interferometer continuously in a pass band mode, and to use only the first Fabry-Perot interferometer as a shutter. The two Fabry-Perot interferometers preferably are designed to have different interference orders on the measurement pass bands, whereby the Fabry-Perot interferometers substantially block the side bands of each other.

Figure 6:
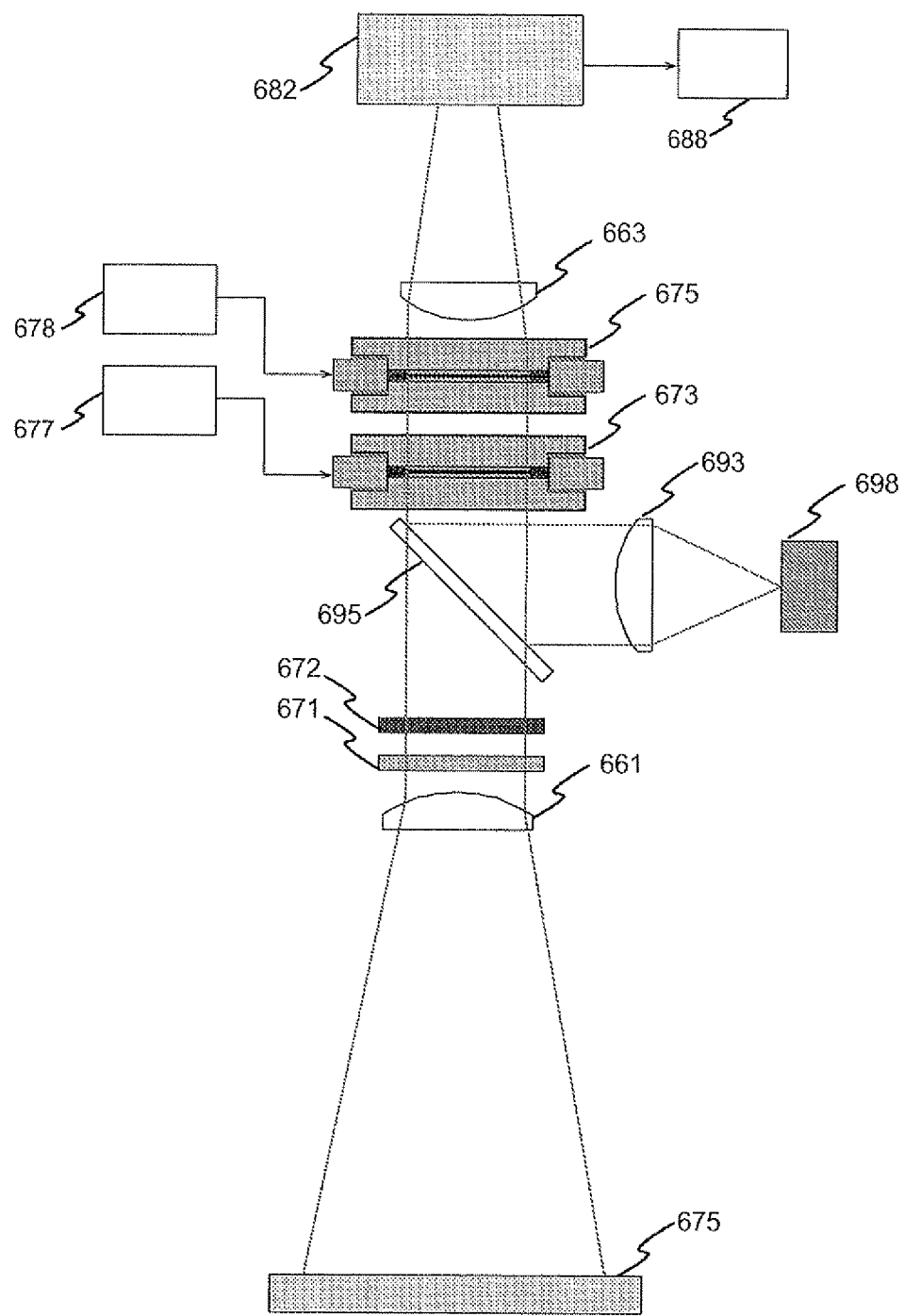
FIG. 6 illustrates an exemplary optical measurement system according to the present invention wherein the illumination is originated from the ambient or from the target itself.

FIG. 6 illustrates a system which does not include a specific illumination source for illuminating the target. In this case the target 675 reflects ambient light, such as sun light, or emits thermal radiation or chemiluminescence radiation, which is measured. The measurement light received from the target 675 is collimated with a lens 661, and further led through a band pass filter which consists of a low pass filter 671 and a high pass filter 672. The purpose of the band pass filter is to filter out light on wavelengths which are outside the operating range of Fabry-Perot interferometers of the system. The measurement light passes through a beam splitter mirror 695 to two successive Fabry-Perot interferometers 673 and 675. The Fabry-Perot interferometers are controlled with control means 677 and 678, respectively. The measurement light is band pass filtered by the Fabry-Perot interferometers, and the filtered measurement light is focused with a lens 663 to a detector 682. The detector may be a single point detector, a 1-dimensional image detector or a 2-dimensional image detector. The signal received from the detector is then read by signal acquisition means 688, and processed in order to achieve a measurement result. A part of the measurement light which is not passed through the Fabry-Perot interferometers 673 and 675 is reflected, and the reflected light is further reflected by the beam splitter mirror 695. The reflected light is then focused by a lens 693 to a reference detector 698 which gives an indication of the total intensity of light received from the target.

It is possible to control the Fabry-Perot interferometers of FIG. 6 in the same manner as was described relating to the measurement system of FIG. 3a. In this case the pass band wavelength of the interferometers is successively controlled into different, predetermined wavelength values. Between the modes of each pass band, the interferometers are preferably controlled into shutter mode. It is also possible to control the Fabry-Perot interferometers in the same manner as was described relating to the measurement system of FIG. 4a in order to provide a target specific filtering of the measurement light. In this case the signal of the detector is integrated over the scanning period of the interferometers.

Figure 7:
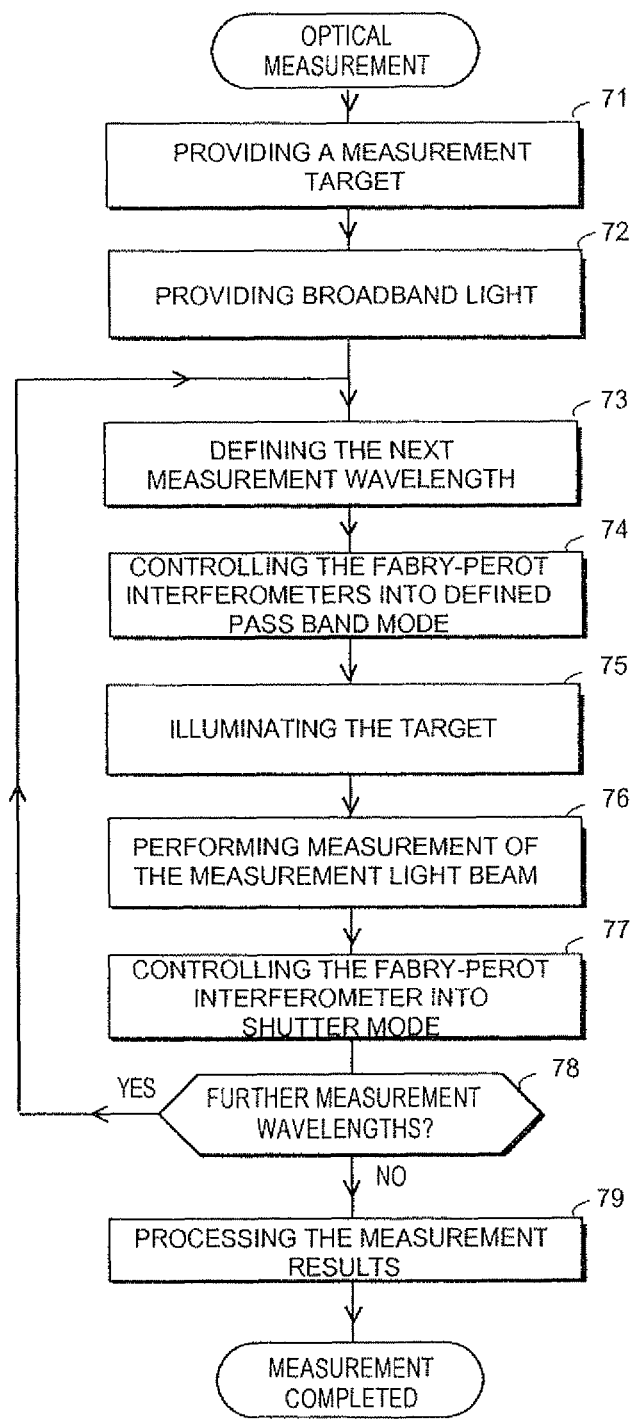
FIG. 7 illustrates an exemplary method for optical measurement according to the present invention, wherein controllable Fabry-Perot interferometers are used in alternated pass band and shutter modes and successive pass bands have different wavelengths.

FIG. 7 illustrates an exemplary method for optical measurement according to the present invention, wherein one or several controllable Fabry-Perot interferometers are used in alternated pass band and shutter modes, and successive pass bands have different wavelengths. In phase 71a measurement target is provided for the optical measurement. In phase 72 broadband light is provided for forming an illumination light beam. Next in phase 73 the wavelength of illumination is defined for the first measurement of the target. The data of the wavelengths to be used may be stored in the memory of the measurement system, for example, whereby the wavelength data is read from the memory before each measurement. A Fabry-Perot interferometer of the measurement system is then controlled into a pass band mode, phase 74, wherein the pass band has a centre wavelength in accordance with the defined wavelength. The target is then illuminated in phase 75. If the Fabry-Perot interferometer is located on the path of the illuminating light beam, the target will be illuminated with light which has been filtered with the Fabry-Perot interferometer.

The measurement light beam received from the target is then measured with a detector in phase 76. The detection may be point detection or image detection. The Fabry-Perot interferometer is then in phase 77 controlled into a shutter mode in order to provide a reference signal from the detector with no substantial measurement light beam reaching the detector. In phase 78 it is checked e.g. from stored measurement parameters whether further measurements with same or different wavelengths are required. If one or several further measurements are required, it is returned to the phase 73, wherein the next wavelength is defined for the measurement. The steps 73-78 are repeated until a required amount of measurements with required wavelengths have been made. The measurement signals received from the detector are then processed in phase 79 in order to achieve measurement results which correspond to e.g. physical properties or substance quantities of the target.

FIG. 8 illustrates an exemplary method for optical measurement according to the present invention, wherein target specific illumination is used and light transmitted through the target is measured. In phase 81a measurement target is provided for the optical measurement. In phase 82 broadband light is provided for forming an illumination light beam. Next in phase 83 the parameters are defined for the first measurement of the target. The parameters include the wavelength range for the measuring, and the spectral weight function describing how each wavelength is to be weighted. The parameter data to be used may be stored in the memory of the measurement system, for example, whereby the parameter data is read from the memory before each measurement. The target is then illuminated, phase 84, and the pass band of the Fabry-Perot interferometer is scanned through the defined range of wavelengths, phase 85. The scanning speed is also controlled in order to achieve the required temporal weighting for each wavelength. The Fabry-Perot interferometer may be arranged to filter the illuminating light beam or the measurement light beam. The measurement light beam is detected simultaneously with the scanning, phase 86. The detected signal is integrated over the scanning period through the defined wavelength range, phase 87, and this way a spectrally weighted measurement result is achieved. The detection may be point detection or image detection.

It is possible to provide measurements with different spectral weights by defining further, corresponding parameter sets. In phase 88 it is checked whether further measurements with same or different parameters are required, and if further measurements are required then phases 83-88 are repeated. Finally the measured signals are processed to achieve the final measurement results, which may correspond to, for example, certain properties or contents of certain substances in the target.

FIG. 9 illustrates an exemplary method for optical measurement according to the present invention, wherein a Fabry-Perot interferometer is used in pass band and shutter modes on a path of an emission light beam of a fluorescent sample. In phase 91 a measurement target is provided for the optical measurement. Next in phase 92 a Fabry-Perot interferometer is controlled into a shutter mode wherein it substantially does not pass any light which could be detected. The Fabry-Perot interferometer is located at the path of the measurement light beam, between a sample and a detector. In phase 93 an excitation pulse is provided on the sample. It is the waited until the background fluorescence has decayed into a negligible intensity, phase 94. After this in phase 95 the Fabry-Perot interferometer is controlled into a pass band mode, wherein light with the emission wavelength is passed. The emission measurement light beam which has passed the Fabry-Perot interferometer is detected with a detector in phase 97. In phase 98 it is checked whether further excitation pulses are to be provided for measuring the sample. If further Excitation pulses are to be provided, phases 92-98 are repeated. The several emission signals are integrated by the detector until the required amount of excitation pulses have been provided. In phase 99 the detector signal is read out, and processed to provide a measurement result. If image detection is used, the result may provide information on the spatial distribution of the emission in the sample.

An optical measurement system commonly includes processing means for performing the optical measurement process. The control of the measuring process in an optical measurement instrument generally takes place in an arrangement of processing capacity in the form of microprocessor(s), and memory in the form of memory circuits. Such arrangements are known as such from the technology of analyzers and relating equipment. To convert a known optical instrument into equipment according to the invention it may be necessary, in addition to the hardware modifications, to store into the memory means a set of machine-readable instructions that instruct the microprocessor(s) to perform the operations described above. Composing and storing into memory of such instructions involves known technology which, when combined with the teachings of this patent application, is within the capabilities of a person skilled in the art.

The invention has been described with the reference to the enclosed embodiments. It is, however, clear that the invention is not restricted only to those, but is comprises all embodiments which can be imagined within the inventive idea and the enclosed patent claims.

For example, the applications and targets of the described embodiments are exemplary and only serve to assist in understanding the functionality of the embodiments. It is, however clear that each embodiment can be used for measuring different types of targets. Also, measurement of e.g. transmittance, reflectance or fluorescence is possible with each of the described embodiments. It is also possible to provide measurements where the illumination is received from the ambient, such as the sun, or where the measurement radiation originates from the target as in the case of thermal radiation or chemiluminescence.

It should also be noted that it is possible in each embodiment to use either a point detector or an image detector.

The invention claimed is:

1. System for optical measurement of a target, the system comprising a detector for receiving measurement light beam from or through the target, and optionally a light source for illuminating the target with an illuminating light beam, wherein the system comprises at least one first Fabry-Perot interferometer within the path of the illuminating light beam and/or the path of the measurement light beam, wherein
at least one light transmission characteristic of each said first at least one Fabry-Perot interferometer is controllable,
the system has first means for controlling each said first at least one Fabry-Perot interferometer into at least two modes with different values of said characteristic, and
the first means for controlling are arranged to control each said first at least one Fabry-Perot interferometer into at least two modes with different values of said characteristic during a measurement of a single target,
the first means for controlling each said first at least one Fabry-Perot interferometer are arranged to control each said first at least one Fabry-Perot interferometer successively into at least two different pass bands with different centre wavelengths in order to provide at least two successive measurements of a single target wherein different spectral components of illumination light and/or measurement light are passed by said first at least one Fabry-Perot interferometer during the at least two successive measurements, and
one mode of the first at least one Fabry-Perot interferometer during a measurement of the target is a shutter mode, wherein the first at least one Fabry-Perot interferometer is controlled to block received light of the at least two different spectral components of the illumination light and/or the measurement light,
in addition to said first at least one Fabry-Perot interferometer, the system has a further pass band filter, wherein the further pass band filter is located within the path of the illuminating light beam or the measurement light beam, wherein the further pass band filter is arranged to substantially block simultaneous transmission of light on more than one pass bands of said first at least one Fabry-Perot interferometer, and
one mode of the first at least one Fabry-Perot interferometer during a measurement of a target is a shutter mode, wherein the first at least one Fabry-Perot interferometer is controlled to block received light of all wavelengths within the pass band of said further pass band filter and/or said fixed pass band filter.

2. System according to claim 1, wherein at least one said characteristic of each said first at least one Fabry-Perot interferometer is the centre wavelength of a pass band of the interferometer.

3. System according to claim 1, wherein said further pass band filter is a second controllable Fabry-Perot interferometer, wherein the system has means for controlling the pass band of the second Fabry-Perot interferometer.

4. System according to claim 1, wherein the system further comprises a fixed pass band filter, which has a fixed pass band and may include a single pass band filter component or a successive low pass filter and a high pass filter, whereby the fixed pass band filter is arranged to substantially block light on wavelengths that are outside the operating range of the first at least one Fabry-Perot interferometer.

5. System according to claim 1, wherein the system has the first at least one Fabry-Perot interferometer on the path of the illuminating light beam between the light source and the measurement target, and a second Fabry-Perot interferometer on the path of the measurement light beam between the target and the measurement detector, wherein the system has second control means for controlling the second Fabry-Perot interferometer, and during a measurement of a target the first and second control means are arranged to control the first at least one Fabry-Perot interferometer and the second Fabry-Perot interferometer into pass bands which have substantially same centre wavelengths.

6. System according to claim 1, wherein the first means for controlling are arranged to make the first at least one Fabry-Perot interferometer to scan its pass band through a predetermined wavelength range, and to control the scanning rate in order to provide a predetermined spectral distribution of transmittance over the scanning period.

7. System according to claim 6, wherein the first at least one Fabry-Perot interferometer is located between the light source and the target in order to provide a target specific illumination on the target.

8. System according to claim 6, wherein the first at least one Fabry-Perot interferometer is located between the target and the detector in order to provide a target specific filtering of the measurement light.

9. System according to claim 1, wherein the system has means for controlling the light source for providing excitation light pulses to a target sample, whereby the first control means are arranged to control each said first at least one Fabry-Perot interferometer into a shutter mode during the excitation light pulse, and during a predetermined first time period after the excitation light pulse, and to control each said first at least one Fabry-Perot interferometer into the pass band mode for a second predetermined time period after the first time period, thus providing time resolved measurement of the target sample.

10. System according to claim 1, wherein the system has means for integrating a signal produced by the emission light received to the detector from several pass band periods of the first at least one Fabry-Perot interferometer, and means for providing measurement result on the basis of the integrated signal.

11. System for optical measurement of a target, the system comprising a detector for receiving measurement light beam from or through the target, and optionally a light source for illuminating the target with an illuminating light beam, wherein the system comprises at least one first Fabry-Perot interferometer within the path of the illuminating light beam and/or the path of the measurement light beam, wherein
- at least one light transmission characteristic of each said first at least one Fabry-Perot interferometer is controllable, and
- the system has first means for controlling each said first at least one Fabry-Perot interferometer into at least two modes with different values of said characteristic, and
- the first means for controlling are arranged to control each said first at least one Fabry-Perot interferometer into at least two modes with different values of said characteristic during a measurement of a single target, and
- the first means for controlling each said first at least one Fabry-Perot interferometer are arranged to control each said first at least one Fabry-Perot interferometer successively into at least two different pass bands with different centre wavelengths in order to provide at least two successive measurements of a single target wherein different spectral components of illumination light and/or measurement light are passed by said first at least one Fabry-Perot interferometer during the at least two successive measurements, and
- one mode of the first at least one Fabry-Perot interferometger during a measurement of the target is a shutter mode, wherein the first at least one Fabry-Perot interferometer is controlled to block received light of the at least two different spectral components of the illumination light and/or the measurement light, and
- in addition to said first at least one Fabry-Perot interferometer the system has a further pass band filter, wherein the further pass band filter is located within the path of the illuminating light beam or the measurement light beam, wherein the further pass band filter is arranged to substantially block simultaneous transmission of light on more than one pass bands of said first at least one Fabry-Perot interferometer, and
- one mode of the first at least one Fabry-Perot interferometer during a measurement of a target is a shutter mode wherein the first at least one Fabry-Perot interferometer is controlled to block received light of all wavelengths within the pass band of said further pass band filter and/or said fixed pass band filter, and during a measurement sequence for measuring a target the system is in one phase arranged to control the first at least one Fabry-Perot interferometer into a pass band mode for transmission of the illuminating light beam or the measurement light beam, and in another phase arranged to control the first at least one Fabry-Perot interferometer into a shutter mode.

12. System for optical measurement of a target, the system comprising a detector for receiving measurement light beam from or through the target, and optionally a light source for illuminating the target with an illuminating light beam, wherein the system comprises at least one first Fabry-Perot interferometer within the path of the illuminating light beam and/or the path of the measurement light beam, wherein
- at least one light transmission characteristic of each said first at least one Fabry-Perot interferometer is controllable, and
- the system has first means for controlling each said first at least one Fabry-Perot interferometer into at least two modes with different values of said characteristic, and
- the first means for controlling are arranged to control each said first at least one Fabry-Perot interferometer into at least two modes with different values of said characteristic during a measurement of a single target,
- the first means for controlling each said first at least one Fabry-Perot interferometer are arranged to control each said first at least one Fabry-Perot interferometer successively into at least two different pass bands with different centre wavelengths in order to provide at least two successive measurements of a single target wherein different spectral components of illumination light and/or measurement light are passed by said first at least one Fabry-Perot interferometer during the at least two successive measurements, and
- one mode of the first at least one Fabry-Perot interferometer during a measurement of the target is a shutter mode, wherein the first at least one Fabry-Perot interferometer is controlled to block received light of the at least two different spectral components of the illumination light and/or the measurement light, and
- the system comprises means for integrating the detected light or a resulting detected signal over a predetermined time period,
- the first at least one Fabry-Perot interferometer is located in the path of measurement light between the target and the detector, whereby the first controlling means are arranged to control each said first at least one Fabry-Perot interferometer between a shutter mode and a pass band mode, whereby in the pass band mode the first at least one Fabry-Perot interferometer transmits an emission signal of the target to the detector, and in the shutter mode the first at least one Fabry-Perot interferometer substantially blocks the light received from the target.

* * * * *